Feb. 23, 1943. C. H. MARTIN 2,312,258
COUPLING MECHANISM
Filed Sept. 30, 1941 2 Sheets-Sheet 2
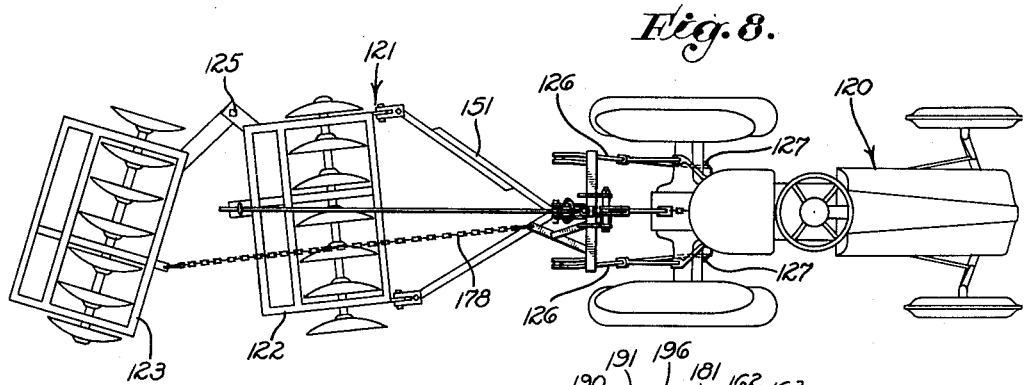
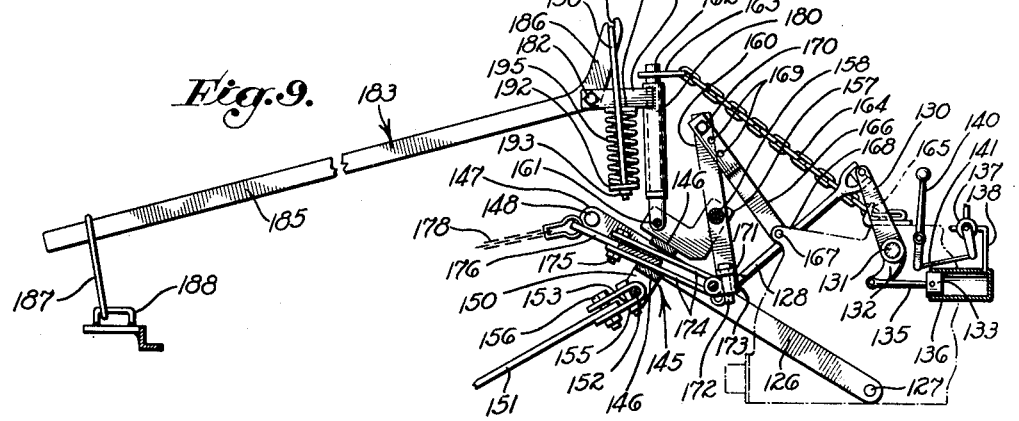
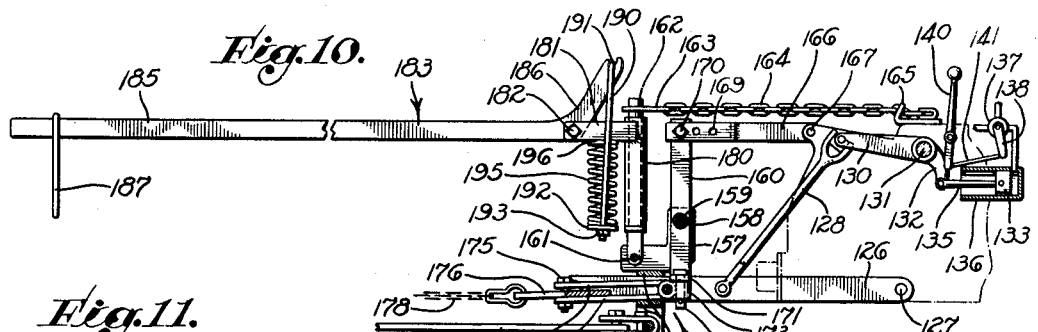
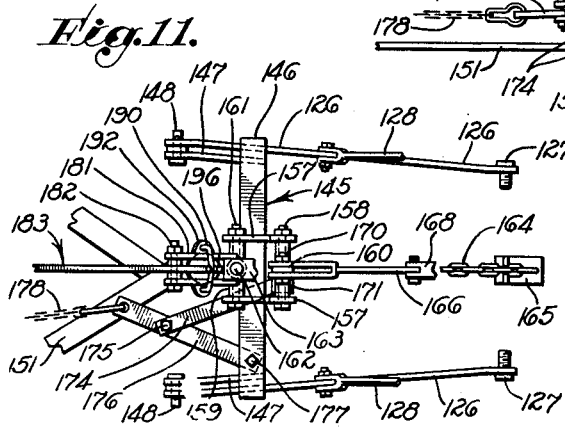
INVENTOR
CHARLES H. MARTIN
BY HARRIS, KIECH, FOSTER & HARRIS
FOR THE FIRM
ATTORNEYS Patented Feb. 23, 1943

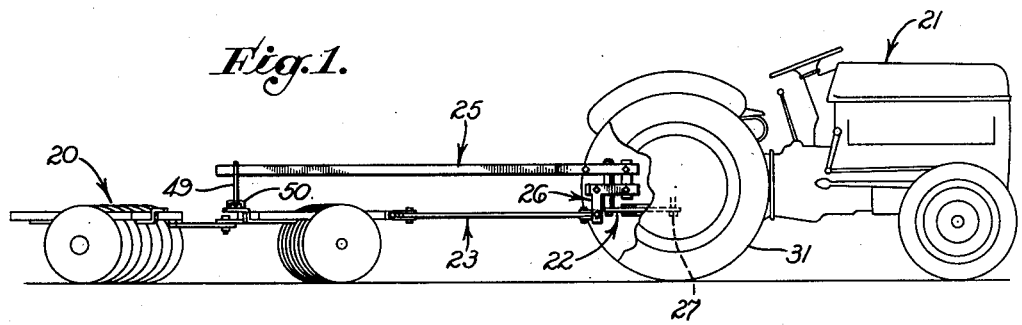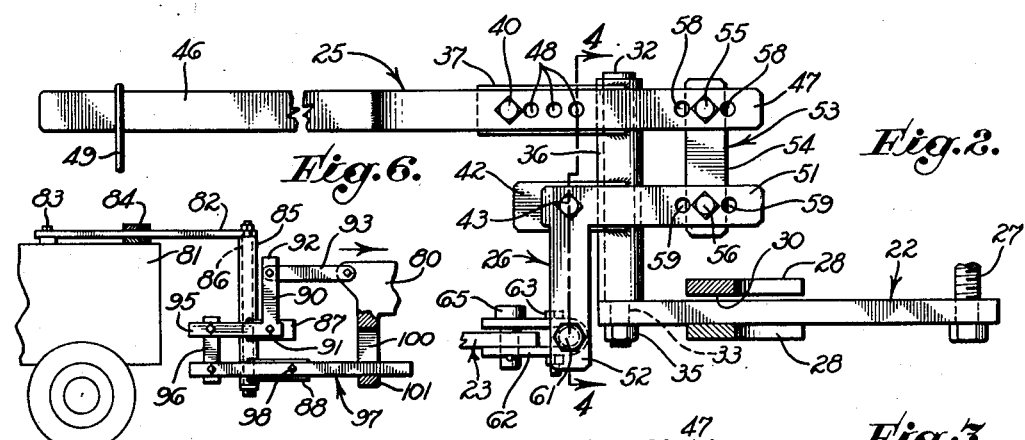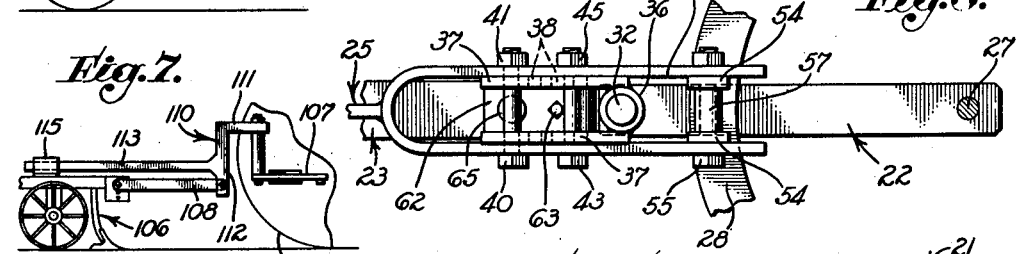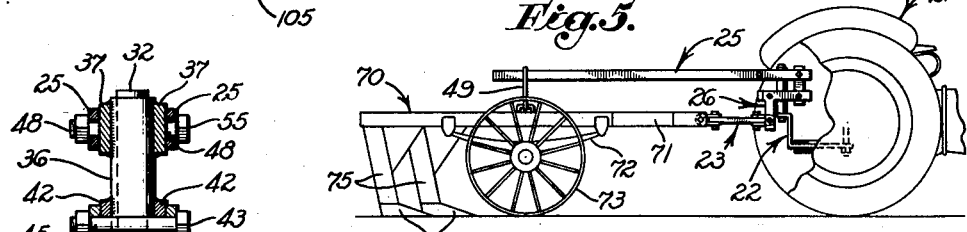

2,312,258

UNITED STATES PATENT OFFICE 2,312,258

COUPLING MECHANISM

Charles H. Martin, Huntington Park, Calif., assignor to Howard B. Rapp and Sally Rapp, copartners doing business under the fictitious firm name and style Towner Manufacturing Co., Santa Ana, Calif.

Application September 30, 1941, Serial No. 412,991

25 Claims. (Cl. 280—33.44)

My invention relates to couplings for connecting a draft vehicle or tractor device to various trailing devices, and more particularly refers to a coupling mechanism adapted to affect the traction or ground pressure of the tractor device.

The invention is widely applicable to coupling devices and in various developments may be employed for coupling transportation devices such as trailers, sleds and the like, or may be employed to operate various implements such as drags, scrapers, roller packs, harrows, plows, and the like. The coupling mechanism may be employed with a draft-vehicle either to push or pull the accompanying vehicle or implement and may be employed either to increase or decrease the traction of the draft-vehicle. For the purpose of the present disclosure, I elect to describe the invention as employed for coupling a ground-working implement to a tractor, such a disclosure affording adequate guidance for applying the invention wherever it may have utility.

The draft force that may be transmitted from a tractor to a trailing device depends both on the capacity of the tractor power plant and on the traction or effectiveness with which the tractor engages the ground. If a tractor is relatively heavy, and especially if the tractor is provided with extensive track-type treads or is provided with wheels that actively dig into the ground, traction may not be a problem. On the other hand, excessive weight in tractors is avoided as expensive not only in increasing the original cost of the tractor but also in increasing the cost of operation, and, moreover, tractors are now commonly mounted on pneumatic tires that do not engage the ground in a positive manner. Consequently the limiting factor is nearly always traction and the common problem is to develop enough traction to make available the full power rating of the tractor. At times operators attempt to meet this problem by weighing down a tractor with ballast and by resorting to various undesirable expedients for increasing the ground-engaging effectiveness of pneumatic tires.

The general object of my invention is to provide a mechanism effective between a tractor and a trailing device to increase the traction of the tractor and thereby increase the availability of the power of the tractor engine. More specifically, it is my object to provide means effective between the tractor and the trailing device in effect to transmit weight from the trailing device to the tractor and thereby increase the ground pressure of the tractor with corresponding decrease in the ground pressure of the trailing device. An important advantage of such a mechanism is that it may utilize any excess weight in the trailing device by delivering that weight to the tractor. Usually the weight of a trailing device as dictated by structural considerations is in excess of the ground pressure requirement of the trailing device.

The various forms of my invention are characterized by the use of what may be termed tension means between a tractor device and a coupled device supported by one of the two devices and operatively connected to the other of the two devices to exert an upward or downward force on the one of the two devices and by reaction exert an opposite force on said other of the two devices. In either event, the arrangement is such that the ground pressure of the tractor device is increased. Thus, the tension means may be pivotally supported by the tractor device to exert upward force on the coupled device and by reaction increase the ground pressure of the traction device; or, conversely, the tension means may be pivotally supported by the coupled device and exert downward force on the tractor device to increase the ground pressure thereof at the expense of the ground pressure of the coupled device.

In one practice of the invention my object is to derive force from the draft forces between the two devices through the medium of what may be termed a stress-distributing means and to apply the derived force to the above-mentioned stress means to carry out my purpose of increasing the ground pressure of the tractor device. Another object in this particular practice of the invention is to provide a coupling mechanism effective to automatically increase the traction of the tractor device in response to increase in the draft load whereby increased traction will be developed whenever the coupled device meets any undue resistance to forward travel.

In another practice of the invention my object is to produce movement for certain purposes in the coupled device as well as to produce increased traction on the part of the tractor device in response to increase in the draft load. My object here may be to make it possible, for example, to vary the effective depth of a ground-working tool in response to increased draft load as well as to increase the traction of the tractor device. In such an arrangement whenever excessive resistance to forward travel is created by the ground-working tool, the increase in the draft load automatically increases the traction of the tractor and simultaneously causes the ground-working tool to be lifted for reduction of the draft load.

In another practice of the invention an object is to provide means functionally independent of the mechanical coupling for utilizing the weight of the coupling device to increase the traction of the tractor device. This practice of the invention is characterized by the use of a stress means between the two devices in combination with yielding means, preferably adjustable, to exert force on the stress means and thereby increase the ground pressure of the tractor device at the expense of the ground pressure of the coupled device.

One practice of the invention relates to articulated draft mechanisms that are adapted for folding and unfolding operation for the purpose of controlling a coupled device. For example, such a coupling linkage heretofore employed is adapted to fold and unfold under the control of the operator for the purpose of closing and opening the two gangs of a disc harrow. In this practice of the invention one object is to provide a stress-distributing means between the two devices for my described purpose that will be effective at both the folded and unfolded positions of the mechanical coupling. Another object in this practice is to provide such an arrangement in which the folding and unfolding operation of the mechanical coupling between the two devices will have little or no significant effect on the contribution to the ground pressure of the tractor device by the stress means.

Other objects and advantages of my invention will be apparent in my detailed description to follow, taken with the accompanying drawings.

In the drawings, which are to be considered as illustrative only:

Fig. 1 is a side elevation of a tractor and disc harrow coupled by a preferred embodiment of my invention, a portion of the tractor being broken away for clarity;

Fig. 2 is a side elevation of the coupling mechanism on an enlarged scale;

Fig. 3 is a plan view of the coupling mechanism;

Fig. 4 is a cross section taken as indicated by the line 4—4 of Fig. 2;

Fig. 5 is a side elevation of an implement equipped with the coupling linkage for the purpose of varying the working depth of a ground-working tool as well as varying the traction of the tractor in response to variations in the draft load;

Fig. 6 is a side elevation partly in section showing a modification of the coupling mechanism;

Fig. 7 is a similar view of another modification of the coupling mechanism;

Fig. 8 is a plan view of a tractor and a disc harrow equipped with another form of my invention, the tractor and harrow being coupled by an articulated draft means;

Fig. 9 is a side elevation on an enlarged scale of the mechanism between the tractor and harrow in Fig. 8, the coupling being in folded position;

Fig. 10 is a similar view with the coupling in unfolded position; and

Fig. 11 is an enlarged detail of Fig. 8.

Fig. 1 shows the preferred form of my invention as employed to couple an implement 20 in the form of a disc harrow to a tractor 21. The principal parts of the coupling mechanism include a first draft means 22 extending rearwardly from the tractor, a second draft means 23 extending forwardly from the implement 20, a stress means 25 pivotally supported by the first draft means and operatively connected to the implement 20 to exert an upward force on the implement, and a stress-distributing means 26 likewise pivotally supported by the first draft means and operatively connected both to the second draft means 23 and to the stress means 25 for transmitting the required force to the stress means.

The first draft means 22 is in the form of a draw bar mounted on a pivot bolt 27 and extending through a slide support on the rear of the tractor, the slide support comprising a pair of horizontal arcuate bars 28 spaced to form a horizontal slot 30. The slot 30 permits lateral oscillation of the draw-bar but holds the draw-bar against downward movement relative to the tractor. It is apparent that any downward force applied to the rear end of the first draft means 22 will be transmitted to the tractor to increase the ground pressure and traction of the rear power driven tractor wheels 31. The second draft means 23 in the arrangement shown in Fig. 1 comprises the usual pair of draw-bars that converge forward from the disc harrow and are interconnected at their forward ends.

Any suitable means may be provided for pivotally mounting the stress means 25 and the stress-distributing means 26 on the first draft means 22. Preferably, but not necessarily, the mounting means permits rotation of both the stress means and the stress-distributing means about a vertical axis relative to the first draft means. In the particular construction shown by way of example in Figs. 2, 3, and 4, a pivot post 32 is rigidly mounted on the end of the first draft means or draw-bar 22, the pivot post having a reduced lower end 33 that extends through the draw-bar and is secured by a suitable nut 35. Rotatably encasing the pivot post 32 is a pivot sleeve 36 that is free to rotate about the axis of the pivot post and is equipped to pivotally support both the stress means 25 and the stress-distributing means 26. To support the stress means 25 the pivot sleeve 36 carries a pair of rearwardly extending arms 37 having a plurality of pairs of holes 38 (Fig. 3) in which a pivot bolt 40 carrying a nut 41 may be inserted selectively. To support the stress-distributing means 26, the pivot sleeve may likewise be provided with a second and shorter pair of arms 42 that carry a pivot bolt 43 with a nut 45.

The stress means 25 is in the form of a relatively long bar that is forked at its forward end to pass along the outer faces of the two arms 37 and to extend forward past the pivot sleeve 36, the bar being fulcrumed on the pivot bolt 40 to provide a relatively long rear lever arm 46 and a relatively short forward lever arm 47. Preferably the forked end of the stress means 25 is provided with a plurality of holes 48 to receive the pivot bolt 40 selectively. The described arrangement permits shifting the pivot bolt 40 for either the purpose of changing the relative lengths of the two lever arms 46 and 47 or for the purpose of shifting the stress means forward or rearward. The rear lever arm 46 of the stress means is operatively connected to the implement, for example, by an elongated link 49 that encircles the lever arm and passes through a metal loop or bracket 50 on the implement 20.

The stress-distributing means 26 may be in the form of two angular bars on opposite sides of the pairs of arms 42, the two angular bars being interconnected in a unitary manner to serve as a bell-crank having a forwardly extending arm 51 and a downwardly extending arm 52, the bell-crank being rotatably supported by the pivot bolt 43. The arm 51 of the bell-crank or stress-distributing means 26 is operatively connected to the shorter lever arm 47 of the stress means 25, preferably in an adjustable manner. In the construction shown in the drawings the operative connection is made through a link 53 comprising a pair of short bars 54 that are connected to the lever arm 47 by an upper pivot bolt 55 and are connected to the bell-crank arm 51 by a lower pivot bolt 56, the two bolts extending through spacer sleeves 57. The lever arm 47 has a plurality of holes 58 to permit selection in the location of the upper pivot bolt 55 and likewise the bell-crank arm 51 has a plurality of holes 59 to permit varying the location of the lower pivot bolt 56.

The downwardly extending bell-crank arm 52 of the stress-distributing means 26 is pivotally connected to the second draft means 23 preferably in a manner permitting universal relative motion. In the construction shown, a horizontal pivot bolt 61 mounted in the bell-crank arm 52 is embraced by a U-shaped bar 62, a small bolt 63 extending across the two legs of the U-shaped bar 62 against the periphery of the pivot bolt. The U-shaped bar receives the forward end of the second draft means 23 and is rotatably connected thereto by a suitable vertical pivot pin 65.

The mode of operation of the coupling mechanism may be readily understood from the above description. It is apparent that the stress-distributing means or bell-crank 26 is a rotary means constituting a part of the draft connection between the implement 20 and the tractor 21, and that a portion of the draft load is transmitted through the stress-distributing means 26 to the stress means 25 in a manner to exert an upward pull on the implement 20. Thus, the draft resistance of the second draft means 23 urges the stress-distributing means 26 in a clockwise direction, as viewed in Fig. 2, thereby pulling downward on the link 53 to urge the stress means 25 in a clockwise direction about the pivot bolt 40. Since the stress means 25 is fulcrumed on the draw-bar 22, the lifting action by the stress means on the implement 20 causes a downward reaction on the tractor 21. In effect, a portion of the weight of the implement 20 is transmitted through the coupling mechanism to the tractor to increase the ground pressure of the tractor wheels 31. As indicated in Fig. 1, the stress means 25 is preferably connected to the trailing implement somewhat centrally of the implement so that the stress means affects the implement as a whole, and tends to reduce ground pressure of the implement uniformly among the various supporting or ground-engaging members. The fact that the stress means 25 is adjustable with respect to the relative lengths of its two arms and the fact that the link 53 is adjustable to vary the effective length of the lever arm 47 and of the bell-crank arm 51 make the mechanism flexible in the sense that the operator may vary the amount of weight that is transmitted from the implement to the tractor.

The utility of the coupling mechanism as a means for increasing the availability of the power of a tractor engine for drawing an implement has been demonstrated in a convincing manner. The traction of a conventional tractor may be increased as much as 20%. If desired, the coupling linkage can be constructed and designed to develop a ground pressure substantially equal to the horizontal pulling force applied to the trailing implement.

The construction and adjustment of the described coupling mechanism will vary for different tasks, and the effect of the coupling mechanism on the implement or other coupled device may vary in different situations. The disc harrow 20 in Fig. 1, for example, may require only 75% of its weight to maintain a given working depth in the soil. In that event, the coupling mechanism may transmit up to 25% of the weight of the implement to the tractor without materially reducing the ground-working effectiveness of the implement. In such an arrangement, both the draft load and the weight transfer through the coupling mechanism may vary through a normal range in accordance with variations in the resistance to forward travel offered by the implement, while the implement nevertheless maintains a substantially constant working depth.

Under other working conditions, it may be desirable to adjust the coupling mechanism to transmit as much as 50% of the weight of the same implement to the tractor when the draft forces exerted through the coupling mechanism reach a relatively high value. The purpose of such adjustment would be to cause the coupling mechanism to serve not only as means for transmitting weight from the implement to the tractor, but also to vary the working depth of the implement. An excessive increase in the resistance of the implement to forward travel would increase the draft load exerted through the coupling mechanism and two separate actions would occur automatically to discourage slippage on the part of the tractor, the first action being the transmission of additional weight to the tractor to increase the ground pressure of the tractor and the second action being the elevation of the implement to lower the resistance of the implement to forward travel.

Under some circumstances it may be desirable to make the trailing implement highly responsive vertically to changes in the draft load transmitted through the coupling mechanism, and one form of my invention is characterized by the concept of mounting the trailing implement on springs to achieve the desired degree of responsiveness. Fig. 5 for example, shows the same coupling mechanism as above described employed to hitch an implement 70 to the tractor 21. The implement 70, which is shown in the form of a subsoiler, has a frame 71 supported by leaf springs 72 on ground wheels 73. Extending downwardly from the frame 71 are standards 75 carrying ground-working members 76. The addition to the combination of yielding means in the form of the leaf springs 72 results in a marked tendency for the implement frame 71 to vary in elevation in response to variations in the lifting force of the stress means 25. The implement will tend to work at maximum depth and will retract the ground-working members 76 automatically whenever the draft load reaches an undesirable magnitude. When drawn across a field of varying soil condition, the ground-working member 76 will penetrate deeply into soft soil and less deeply into hard soil. It is apparent that the coupling mechanism may be applied according to the same principles to the control of various ground-working and surfacing implements employed in agriculture and in road building. For example, the coupling mechanism may serve to vary the working pressure of a scraper mechanism carried by the trailing device.

The purpose of Fig. 6 is to exemplify the fact that certain reversals may be made in the coupling mechanism without departing from the principles of the invention. In Fig. 6 the rear end 80 of a draft-vehicle, for example, a truck, is coupled to the front end of a trailer 81. In this combination the first draft means is a draw-bar 82 mounted on the trailer 81 by a pivot bolt 83 and extending through a slide support 84 of the character previously described. At the outer end of the draw-bar 82 a downwardly extending pivot sleeve 85 rotatably encases a downwardly extending pivot post 86 in the manner heretofore described, the pivot sleeve being provided with an upper bracket 87 and a lower bracket 88. A stress-distributing means in the form of a bell-crank 90 is mounted on the upper bracket 87 by a pivot bolt 91. An upwardly extending arm 92 of the bell-crank is linked to the draft-vehicle by a second draft means or draw-bar 93. A rearwardly extending arm 95 of the bell-crank is connected by a link 96 to a stress member 97 that is mounted on the lower bracket 88 by a suitable pivot bolt 98. The stress means 97 extends forward into sliding engagement with the opening 100 of a downwardly extending bracket or slide support 101 on the rear of the draft-vehicle. It is apparent that draft force transmitted through the linkage of Fig. 6 causes the stress member 97 to press downward on the bracket 101 to increase the ground pressure of the draft-vehicle and that the reaction to this downwardly exerted force is an upwardly exerted force on the trailer 81.

Fig. 7 illustrates the fact that the principles of the invention may be embodied in a relatively simple coupling linkage. In Fig. 7 a tractor represented by a rear wheel 105 is connected to an implement 106 by a linkage comprising a first draft means in the form of a draw-bar 107 extending rearwardly from the tractor, a second draft means in the form of a draw-bar 108 extending forwardly from the implement, and an intermediate link 110 that interconnects the two draft means and functions both as a stress means for transmitting weight and as a stress-distributing means for governing the magnitude of the transferred weight. The first draft means 107 is of the same construction as the first draft means 22 heretofore described with reference to Figs. 1 to 4 and the second draft means or draw-bar 108 is a simple draft link. The intermediate link 110 has three arms, a forwardly extending arm 111 pivotally connected to the first draft means 107, a downwardly extending arm 112 pivotally connected to the second draft means or draw-bar 108, and a third arm 113 unitary with the downwardly extending arm 112 and extending rearward therefrom into sliding engagement with a bracket 115 on the implement 106. It is apparent that a draft load exerted through the linkage of Fig. 7 will cause the third arm 113 of the intermediate link to exert an upward force on the implement 106 and to create a corresponding downward force on the tractor.

In the form of the invention shown in Figs. 8 to 11, inclusive, the means for transferring weight for the increase of traction is not subject to draft forces and is separate from the draft coupling means.

Fig. 8 shows a tractor 120 pulling an implement 121 in the form of a disc harrow having a front gang 122 and a back gang 123 pivotally interconnected by a king bolt 125. The tractor 120 has a pair of rearward arms 126 mounted on pivots 127 to serve as draw-bars for pulling the implement 121. The two arms 126 are connected by operating links 128 to a pair of rocker arms 130 respectively, the two rocker arms 130 being mounted on a rocker shaft 131. Keyed to the rocker shaft 131 is a downwardly extending rocker arm 132 that is connected to a piston 133 by a connecting rod 135. The piston 133 is mounted in a hydraulic cylinder 136 and may be forced rearward by the introduction of liquid into the cylinder under the control of a valve 137. The valve 137 has an operating arm 138 that is shown connected to a control lever 140 by a link 141.

The two rearwardly extending arms 126, which are commonly termed tension links, may normally extend rearward substantially horizontally, as shown in Fig. 10. Whenever the operator desires to swing the arms upward, as indicated by Fig. 9, he manipulates the control lever 140 to admit liquid to the hydraulic cylinder 136 for the purpose of moving the piston 133 rearward. The rearward movement of the piston causes clockwise rotation of the rocker shaft 131, thereby causing the links 128 to draw the rearward arms 126 upward. A mechanism comprising these elements on the rear of a tractor is well known and is commonly employed to govern the depth of penetration of a ground-working implement drawn by the tractor.

The present invention includes both the conception of using the described mechanism for transmitting controlling force to the trailing implement and the conception of employing means for transmitting weight from the trailing device to the tractor preferably in such manner that the described hydraulic operation has relatively little effect on the magnitude of the transmitted weight.

The invention includes a yoke generally designated 145 mounted on the rearward arms 126 to move therewith in a unitary manner. The yoke comprises a pair of parallel bars 146 engaging the rearward arms 126 from above and below, the two parallel bars 146 being mounted on a pair of short rearwardly extending bars 147 that are attached respectively to the rearward arms 126 by suitable bolts 148. The yoke 145 has a central downwardly extending bracket 150 to which the forwardly converging draw-bars 151 of the disc harrow are attached by suitable means permitting universal motion. In the construction shown, the bracket 150 carries a horizontal bolt 152 on which a U-shaped bar 153 is anchored by a bolt 155 for pivotal motion. The two legs of the U-shaped bar 153 are pivotally connected to the draw-bars 151 by an upright pivot bolt 156. On the upper side of the yoke 145 is mounted a pair of spaced angular members 157 that are interconnected by a bolt 158 to pivotally support an upright lever 160 and are interconnected by a second bolt 161 to support an upright pivot post 162. The two bolts 158 and 161 may be provided with spacer sleeves 159. The upper end of the pivot post 162 carries a small plate 163 that is adjustably connected to the tractor by a chain 164 in engagement with a hook 165. It will be noted in Figs. 9 and 10 that the chain 164 is substantially or nearly parallel with the two rearward arms 126 and serves to hold the pivot post 162 in generally upright position when the rearward arms 126 are moved up and down about their pivots.

The upright lever 160 is adjustably interconnected with the tractor by a link 166. The link is attached to the tractor by a suitable pivot bolt 167 in a bracket 168 and has a forked end extending to opposite sides of the upright lever 160, the forked end of the link having a plurality of holes 169 into which a pivot bolt 170 may be inserted selectively for operatively connecting the link with the upright lever. A comparison of Figs. 9 and 10 reveals the manner in which movement of the rearward arms 126 from their normal horizontal position to their upwardly inclined positions carries the fulcrum bolt 158 of the upright lever 160 in a path to cause the upright lever to shift and swing forward toward the tractor 120. Pivotally mounted on a flange 171 at the lower end of the upright lever 160 by means of a bolt 172 is a clevis member 173 that is pivotally connected to a pair of diagonal links 174. The diagonal links 174 are pivotally connected by a bolt 175 to a control arm 176 that is mounted on the yoke 145 by a pivot bolt 177 and the outer end of the control arm 176 is operatively connected by a chain 178 to the back gang 123 of the implement 121.

In the normal position of the described linkage shown in Figs. 8 and 10, the two gangs of the disc harrow are in open positions for cultivating. When the operator desires to close the disc harrow to any degree, he manipulates the control lever 140 to cause the rearward arms 126 to be tilted upward to whatever degree may be desired. The upward tilting of the rearward arms 126 acting on the upright lever 160 causes the diagonal links 174 to be drawn forward with corresponding rotation forward of the control arm 176. As a result the chain 178 is pulled forward to draw the back gang 123 toward the front gang 122.

It is apparent that the two rearward arms 126 and the draw-bars 151 of the implement constitute an articulated draft means that may be folded to the position shown in Fig. 9 or unfolded to the position shown in Fig. 10 for the purpose of transmitting control forces to the coupled device through the chain 178. Such a coupling arrangement may be utilized to serve various control functions. For example, the chain 178 or equivalent means may be employed to operate valves, control levers, brakes, signalling devices, etc. on the trailing implement or vehicle.

The pivot post 162 rotatably carries a pivot sleeve 180 equipped with a bracket 181 in which is mounted a bolt 182 to pivotally support a tension means 183. Preferably the tension means 183 is of angular configuration providing a relatively long arm 185 extending to the rear and a relatively short arm 186 extending forwardly and upwardly from the pivot bolt 182. The long arm 185 is connected to the implement 121 in the manner heretofore described by a link 187 encircling the arm and passing through a bracket 188 on the implement. The short arm 186 of the tension means 183 is operatively connected with the pivot sleeve 180 by some suitable means for causing the tension means to lift upward on the implement 121.

In the particular construction shown in the drawings a yoke 190 in the form of a U-shaped rod rests in a notch 191 at the end of the short arm 186, the lower ends of the rod extending through a transverse plate 192 and being provided with suitable nuts 193 to retain the plate. Seated on the plate 192 is a helical compression spring 195 that presses upward against a small plate 196 carried by the bracket 181 on the pivot sleeve 180. By rotatably adjusting the nuts 193 the compression of the spring 195 may be varied to vary the downward force applied to the tension means 183 through the yoke 190. The effect of the spring is to lift upward on the implement 121 and by reaction to press downward on the two rearward arms 126. Since the rearward arms 126 are held against downward movement and therefore do not yield to this downward pressure, the downward reaction is transmitted to the ground wheels of the tractor.

Figs. 9 and 10 represent the range of angular movement of the tension means 183 relative to the pivot sleeve 180 incidental to folding and unfolding operation of the coupling mechanism. A feature of my described arrangement is that the magnitude of the weight transmitted by the tension means to the tractor is not affected to any substantial degree by the relative rotation of the tension means. In this regard the invention is characterized by the concept of providing for two opposite effects that tend to cancel each other to make the transmitted force constant throughout the angular movement of the tension means. One of these effects is the tendency of the arrangement to increase the lifting effect of the tension means since the spring 195 is placed under greater compression when the short arm 186 rocks forward from the position shown in Fig. 10 to the position shown in Fig. 9. The increased compression of the spring is kept at a minimum by causing the spring to transmit force to the short arm 186 in a direction that lies close to the rotational axis of the short arm. In other words, the range of rotary motion of the short arm is in an arc chosen with respect to the direction of force from the spring to minimize variations in the compression of the spring. The second and opposite effect resides in the fact that the yoke 190 swings toward the axis of rotation of the short arm 186 as the short arm moves from the position shown in Fig. 10 to the position shown in Fig. 9. In other words, the direction in which force is transmitted from the spring to the short arm shifts toward the axis of rotation of the arm as the compression of the spring is increased. It is apparent that the progressive increase of force created by the progressive compression of the spring with the progressive rearward rotation of the short arm acts through progressively less favorable leverage to lift upward on the trailing implement 121. These two opposite effects may be so nearly balanced at the various angular positions of the stress means that the lifting action of the stress means is substantially constant throughout folding and unfolding operation of the coupling mechanism.

The particular forms of my invention described in detail herein for the purpose of disclosure and to illustrate the principles involved will suggest various changes and substitutions under my inventive concept; I reserve the right to all such departures that properly lie within the scope of my appended claims.

I claim as my invention:

1. Means for hitching a trailing device such as a vehicle or ground-working implement to a tractor device in a manner to contribute to the traction of the tractor device, said means comprising: draft means coupling the two devices together; a pivot connected to one of said devices; a stress member mounted on said pivot for up and down oscillation, said stress member being operatively connected to one of said two devices on one side of said fixed pivot; and means acting between said stress member and one of said two devices to create a moment on said stress member about the axis of said pivot to create downward pressure on the tractor device.

2. A combination as set forth in claim 1 in which said stress member is operatively connected to one of said two devices and said acting means is effective between the stress member and the other of said two devices.

3. Means for hitching a trailing device such as a vehicle or ground-working implement to a tractor device in a manner to contribute to the traction of the tractor device, said means comprising: draft means coupling the two devices together; a pivot connected to one of said devices; a stress member mounted on said pivot for up and down oscillation, said stress member being operatively connected to one of said two devices on one side of said pivot; and means including a bell-crank acting between said stress member and one of said two devices to create a moment on said stress member about the axis of said pivot to create downward pressure on the tractor device, said bell-crank being connected to said stress member at a point spaced from said pivot.

4. Means for hitching a trailing device such as a vehicle or ground-working implement to a tractor device in a manner to contribute to the traction of the tractor device, said means comprising: a first draft means extending from one of said devices toward the other; a second draft means extending from the other of said draft devices toward said one draft device; a bell-crank pivotally supported by one of said draft means, one arm of said bell-crank being connected to the other of said draft means to serve as the sole connection between the two draft means; and a stress member operatively connected with one of said devices to vary the ground pressure of the device, said bell crank being operatively connected to said stress member to rotate the stress member about said pivot in response to draft force exerted through said two draft means, said bell-crank being effective to rotate the stress member in a direction to increase the ground pressure on the tractor device.

5. Means for hitching a trailing device such as a vehicle or ground-working implement to a tractor device in a manner to contribute to the traction of the tractor device, said means comprising: a pivot means supported by one of said two devices; stress-distributing means rotatably mounted on said pivot means; draft means connecting said stress-distributing means with the other of said two devices for coupling the two devices together, said draft means being pivotally connected to said stress-distributing means at a different level from said pivot means to cause a moment about said pivot means in response to draft stress; and means operatively connecting said stress-distributing means with one of said devices to vary the ground pressure of the device in response to variation in the magnitude of said moment, said stress-distributing means and said operatively connecting means acting in a direction to increase the ground pressure of said tractor device and correspondingly decrease the ground pressure of the trailing device.

6. Means for hitching a trailing device such as a vehicle or ground-working implement to a tractor device in a manner to contribute to the traction of the tractor device, said means comprising: draft means coupling said two devices together, said draft means being adapted for extension and contraction; stress-distributing means included in said draft means movable in one direction with extension of the draft means and in the other direction with contraction of the draft means; and means to transmit a portion of the weight of the trailing device to the tractor device through said stress-distributing means in a direction to oppose movement of the stress-distributing means with extension of the draft means, said transmitting means being pivotally mounted for rotation to take up a progressively increasing proportion of the weight of the trailing device as said stress-distributing means moves with progressively increasing extension of said draft means, whereby increase in the draft load through the draft means causes increase in the proportion of the weight of the trailing device transmitted to the tractor device.

7. A combination as set forth in claim 6 in which said stress-distributing means comprises a member mounted on a first pivot supported by one of the two devices and is connected to the other of the two devices by a second pivot at a different level.

8. Means for hitching a trailing device such as a vehicle or ground-working implement to a tractor device in a manner to contribute to the traction of the tractor device, said means comprising: a pivot supported by one of said devices; a stress member rotatable about said pivot and operatively connected to the other of the two devices for exerting force thereon with a vertical component to vary the ground pressure of said other of the two devices and thereby vary the ground pressure of said one of the two devices by reaction; and means coupling said other of the two devices to said stress member to provide a draft connection between the two devices, the coupling connection to the stress member being at a location to urge the stress member in response to draft forces in a direction about said pivot to increase the ground pressure of the tractor device and correspondingly decrease the ground pressure of the trailing device.

9. A combination as set forth in claim 5 in which said trailing device is resiliently mounted on rolling supports, whereby the trailing device varies in elevation above the ground in response to variations in the force transmitted through said draft means.

10. Means for hitching a trailing device such as a vehicle or ground-working implement to a tractor in a manner to contribute to the traction of the tractor, said means comprising: draft means providing a first interconnection between the trailing device and the tractor; a stress member extending rearwardly toward said trailing device; means connecting said trailing device to said stress member, said stress member together with said connecting means providing a second interconnection between the trailing device and the tractor; and means supported by the tractor for exerting an upward force on said trailing device through said stress member, thereby creating a downward reaction on the tractor to increase the pressure of the tractor against the ground.

11. Means for hitching a trailing device such as a vehicle or ground-working implement to a tractor in a manner to contribute to the traction of the tractor, said means comprising: draft means extending rearward from said tractor; means mounting said draft means on said tractor, said mounting means being adapted to hold said draft means against downward oscillation relative to the tractor; means coupling said trailing device to said draft means; a rearwardly extending stress member pivotally supported by said draft means, said stress member being connected to the trailing device at a point rearward of its pivot; and means acting between said draft means and said stress member to urge said stress member upwardly with respect to said trailing device, thereby to transmit a portion of the weight of the trailing device to the stress member and create a downward reaction on the tractor through the draft means.

12. Means for hitching a trailing device such as a vehicle or ground-working implement to a tractor device in a manner to contribute to the traction of the tractor device, said means comprising: a support means pivotally connected with one of said two devices for rotation about an upright axis; a stress-distributing means mounted on said support means for rotation about a cross axis; draft means connecting said stress-distributing means with the other of said two devices for coupling the two devices together, said draft means being pivotally connected to said stress-distributing means at a different level from said cross axis to cause a moment about the cross axis in response to draft stress; and a stress member operatively connecting said stress-distributing means with one of said devices to vary the ground pressure of the device in response to variation in the magnitude of said moment, said stress-distributing means and said operatively connecting means acting in a direction to increase the ground pressure of said tractor device and correspondingly decrease the ground pressure of the trailing device.

13. A combination as set forth in claim 12 in which said stress member extends toward said trailing device to lift upward on the trailing device in response to draft force transmitted through said stress-distributing means.

14. A combination as set forth in claim 12 in which said stress member is a lever extending from said support means toward one of said devices and in which said stress-distributing means is a bell-crank having one arm connected to said lever and one arm connected to said other of said two devices.

15. Means for hitching a trailing device such as a vehicle or ground-working implement to a tractor device in a manner to contribute to the traction of the tractor device, said means comprising: a first pivot means supported by one of said two devices; a draft means rotatably mounted on said first pivot means; a second pivot means carried by said draft means at a different level from said first pivot means; means rotatably engaging said second pivot means for coupling said trailing device to said tractor device to create a moment in said draft means about said first pivot means in response to draft forces; and means unitary with said draft means to exert a force with a vertical component on one of the two devices to vary the ground pressure of the device in response to said moment, said moment being in a direction to increase the ground pressure of the tractor device and correspondingly decrease the ground pressure of the trailing device.

16. Means for hitching a trailing device such as a vehicle or ground-working implement to a tractor device in a manner to contribute to the traction of the tractor device, said means comprising: pivot means supported by one of said two devices; stress means rotatably mounted on said pivot means and operatively connected with the other of said two devices to exert force thereon to vary the ground pressure thereof and thereby vary the ground pressure of said one of said two devices by reaction; and force-exerting means connected with said one of said two devices and connected with said stress means to urge the stress means in the rotary direction to increase the ground pressure of the tractor device at the expense of ground pressure of the trailing device.

17. Means for hitching a trailing device such as a vehicle or ground-working implement to a tractor device in a manner to contribute to the traction of the tractor device, said means comprising: pivot means supported by one of said two devices; stress means rotatably mounted on said pivot means and operatively connected with the other of said two devices to exert force thereon to vary the ground pressure thereof and thereby vary the ground pressure of said one of said two devices by reaction; and spring means connected with said one of said two devices and connected with said stress means to urge the stress means in the rotary direction to increase the ground pressure of the tractor device at the expense of ground pressure of the trailing device.

18. A combination as set forth in claim 17 in which adjustable means is provided to control the stressing of said spring and thereby control the magnitude of force transmitted through said stress means.

19. A combination as set forth in claim 17 in which said stress means is operatively connected to said trailing device to lift upward on the trailing device.

20. Means for hitching a trailing device such as a vehicle or ground-working implement to a tractor device in a manner to contribute to the traction of the tractor device, said means comprising: pivot means supported by one of said two devices; stress means rotatably mounted on said pivot means and operatively connected with the other of said two devices to exert force thereon to vary the ground pressure thereof and thereby vary the ground pressure of said one of said two devices by reaction; yielding means connected with said one of said devices and connected with said stress means to urge the stress means in the rotary direction to increase the ground pressure of the tractor device at the expense of ground pressure of the trailing device; and means to shift said pivot means for the purpose of transmitting control forces between the two devices, thereby causing rotation of said stress means through a given range about said pivot means, said yielding means being connected with said stress means to transmit force to said stress means in relatively close alignment with said pivot means to minimize variation in the stress of the yielding means throughout said range of rotation of the stress means.

21. A combination as set forth in claim 20 in which the point at which the yielding means is connected to the stress means moves through an arc in an angular range to produce relatively little variation in the stressing of the yielding means.

22. Means for hitching a trailing device such as a vehicle or ground-working implement to a tractor device in a manner to contribute to the traction of the tractor device, said means comprising: draft means coupling said two devices together, said draft means being articulated for folding and unfolding action; means responsive to the folding and unfolding action of said draft means to transmit control forces between the two devices; pivot means carried by said draft means in a position to be shifted in response to the folding and unfolding action of the draft means; stress means mounted on said pivot means for rotation through a given range about said pivot means in response to the shifting of the pivot means; and yielding means for transmitting force to said stress means, said yielding means being connected with the stress means at a point to urge the stress means in the direction to increase the ground pressure of the tractor device at the expense of ground pressure of the trailing device.

23. A combination as set forth in claim 22 in which said yielding means transmits force to said stress means in a direction relatively close to said pivot means to minimize variation in the stress of the yielding means throughout said range of rotation of the stress means.

24. A combination as set forth in claim 22 in which said yielding means is connected with said stress means to transmit force to the stress means in a direction that approaches said pivot means as said pivot means is shifted in the direction to increase the stressing of the yielding means.

25. Means for hitching a trailing device such as a vehicle or ground-working implement to a tractor device in a manner to contribute to the traction of the tractor device, said means comprising: draft means coupling said two devices together; a stress means pivotally supported by one of said two devices and operatively connected to the other of the two devices for transmitting force thereto in a direction to vary the ground pressure thereof; and yielding means connected to said one of the two devices, said yielding means being connected to said stress means to transmit force thereto in a direction to increase the ground pressure of one of said devices and correspondingly decrease the ground pressure of the other device.

CHARLES H. MARTIN.